United States Patent
Sun et al.

(10) Patent No.: US 12,520,348 B2
(45) Date of Patent: Jan. 6, 2026

(54) CONFIGURATION AND DEFAULT BEAM TECHNIQUES AT HIGH MOVEMENT SPEEDS

(71) Applicant: Apple Inc., Cupertino, CA (US)

(72) Inventors: Haitong Sun, Cupertino, CA (US); Dawei Zhang, Saratoga, CA (US); Hong He, Cupertino, CA (US); Huaning Niu, San Jose, CA (US); Oghenekome Oteri, San Diego, CA (US); Wei Zeng, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 17/917,889

(22) PCT Filed: Nov. 5, 2021

(86) PCT No.: PCT/CN2021/129004
§ 371 (c)(1),
(2) Date: Oct. 7, 2022

(87) PCT Pub. No.: WO2023/077427
PCT Pub. Date: May 11, 2023

(65) Prior Publication Data
US 2023/0276508 A1    Aug. 31, 2023

(51) Int. Cl.
*H04W 76/10* (2018.01)
*H04W 72/1273* (2023.01)
*H04W 72/232* (2023.01)

(52) U.S. Cl.
CPC ........ *H04W 76/10* (2018.02); *H04W 72/1273* (2013.01); *H04W 72/232* (2023.01)

(58) Field of Classification Search
CPC ............. H04W 76/10; H04W 72/1273; H04W 72/232; H04W 72/0453; H04W 72/23;
(Continued)

(56) References Cited

U.S. PATENT DOCUMENTS

| | | | |
|---|---|---|---|
| 2023/0075824 A1* | 3/2023 | Abdelghaffar | H04L 5/0048 |
| 2023/0107490 A1* | 4/2023 | Abdelghaffar | H04L 5/0053 370/329 |
| 2023/0130150 A1* | 4/2023 | Shahmohammadian | H04L 5/0053 370/329 |

(Continued)

FOREIGN PATENT DOCUMENTS

| | | |
|---|---|---|
| CN | 111937457 | 11/2020 |
| CN | 112087291 | 12/2020 |

(Continued)

OTHER PUBLICATIONS

International Search Report and Written Opinion for PCT Patent Application No. PCT/CN2021/129004; 10 pages; Jun. 24, 2022.
Partial Supplementary European Search Report for EP Patent Application No. 21962940.9; Oct. 15, 2024.
(Continued)

*Primary Examiner* — Chae S Lee
(74) *Attorney, Agent, or Firm* — Kowert, Hood, Munyon, Rankin & Goetzel, P.C.

(57) ABSTRACT

A base station may establish a cellular link with a user equipment (UE) according to a single frequency network scheme. The base station may then determine one or more control resource set (CORESET) transmission configuration indication (TCI) states and transmit signaling to configure the UE with the one or more CORESET TCI states. Additionally or alternatively, the one or more CORESET TCI states may be useable by the UE in performing communications with at least one of a first transmission reception point (TRP) and a second TRP associated with the cellular link with the cellular network.

20 Claims, 7 Drawing Sheets

(58) Field of Classification Search
CPC ............. H04W 72/046; H04B 7/06952; H04B 7/088; H04L 5/0035; H04L 5/0053; H04L 5/001; H04L 5/0094
See application file for complete search history.

(56) References Cited

U.S. PATENT DOCUMENTS

2023/0232423 A1\* 7/2023 Cirik ..................... H04L 5/0053
                                                                370/329
2024/0171328 A1\* 5/2024 Nam ..................... H04L 5/0035
2024/0267175 A1\* 8/2024 Matsumura ........... H04L 5/0035

FOREIGN PATENT DOCUMENTS

| CN | 112703797  | 4/2021 |
| CN | 113039730  | 6/2021 |
| CN | 113170335  | 7/2021 |
| CN | 113454931  | 9/2021 |
| WO | 2013047325 | 4/2013 |
| WO | 2021182837 | 9/2021 |
| WO | 2021189337 | 9/2021 |

OTHER PUBLICATIONS

Office Action for JP 2024-526853; Mar. 27, 2025.
CATT "Enhancements on HST-SFN deployment for Rel-17" 3GPP TSG RAN WG1 #106e R1-2106939; Aug. 7, 2021.
QUALCOMM "Enhancements on HST-SFN deployment" 3GPP TSG RAN WG1 #104b-e R1-2103154; Apr. 12, 2021.

\* cited by examiner

CONFIGURATION AND DEFAULT BEAM TECHNIQUES AT HIGH MOVEMENT SPEEDS

PRIORITY CLAIM

This application is a national phase entry of PCT application number PCT/CN2021/129004, entitled "Configuration and Default Beam Techniques at High Movement Speeds," filed Nov. 5, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for configuration and default beam techniques in a high-speed single frequency network scenario in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through wireless devices used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

Additionally, wireless devices are used in an increasing range of contexts. For example, wireless devices may be used at a variety of movement speeds, e.g., ranging from relatively stationary or slow movement speeds (e.g., devices in fixed locations or carried by pedestrians) to very high speeds (e.g., high speed trains (HSTs), etc.). Different techniques and features may provide better performance under different such conditions, at least in some instances. Accordingly, improvements in the field are desired.

SUMMARY

Embodiments relate to apparatuses, systems, and methods for configuration and default beam techniques in a high-speed single frequency network scenario in a wireless communication system.

In some embodiments, a base station may establish a cellular link with a user equipment (UE) according to a single frequency network scheme. The base station may then determine one or more control resource set (CORESET) transmission configuration indication (TCI) states and transmit signaling to configure the UE with the one or more CORESET TCI states. Additionally or alternatively, the one or more CORESET TCI states may be useable by the UE in performing communications with at least one of a first transmission reception point (TRP) and a second TRP associated with the cellular link with the cellular network.

According to some embodiments, the signaling may include media access control-control element (MAC-CE) signaling. Additionally or alternatively, the one or more CORESET TCI states may be included in an active bandwidth part (BWP) of a component carrier (CC). In some embodiments, the one or more CORESET TCI states are associated with a UE-specific search space (USS) or a common search space (CSS) and/or may be configured in different search spaces. Additionally or alternatively, the CSS may include at least one of a Type0-physical downlink control channel (PDCCH) CSS set for system information broadcast 1 (SIB1) monitoring, a Type0A-PDCCH CSS set for system information (SI) monitoring, a Type1-PDCCH CSS set for random access channel (RACH) monitoring, a Type2-PDCCH CSS set for paging monitoring, and/or a Type3-PDCCH CSS set for special downlink control information (DCI) 2_x monitoring.

In some embodiments, a UE may establish a cellular link with a base station (BS) according to a single frequency network scheme. The UE may transmit, to the BS, first signaling comprising measurement information corresponding to at least a first transmission reception point (TRP) and a second TRP associated with the cellular link with the cellular network. The UE may receive, from the BS, second signaling comprising an indication of one or more control resource set (CORESET) transmission configuration indicator (TCI) state configurations. Accordingly, the UE may select, based on the received one or more CORESET TCI state configurations, one or more default beams and further perform communications with at least one of the first and second TRPs using the one or more default beams.

According to some embodiments, the communications performed using the one or more default beams may correspond to at least one of a physical downlink shared channel (PDSCH). Additionally or alternatively, a timing offset between a received downlink control information (DCI) that indicates the one or more TCI state for PDSCH and a corresponding PDSCH may be less than a parameter time-DurationForQCL.

According to further embodiments, the one or more default beams may be selected according to a TCI codepoint with a lowest index that includes two TCI states, a CORESET, configured with the one or more TCI states, with a lowest identifier (ID) in a last slot monitored by the UE on a physical downlink control channel (PDDCH), a TCI codepoint with a lowest index that includes one TCI state or a CORESET, configured with the one or more TCI states, with a lowest ID and a second lowest ID in a last slot monitored by the UE on a physical downlink control channel (PDCCH).

In some embodiments, the measurement information may include Doppler shift measurement information. Additionally or alternatively, the single frequency network (SFN) may be configured to support at least one of one or more physical downlink control channels (PDCCHs) and one or more physical downlink shared channels (PDSCHs). According to some embodiments, a timing offset between a received DCI that schedules PDSCH and indicates the TCI states for the scheduled PDSCH and the corresponding PDSCH may be greater than or equal to than a parameter timeDurationForQCL.

According to some embodiments, the communications performed using the one or more default beams may correspond to at least one of one or more aperiodic channel state information reference signals (AP-CSI-RSs). Additionally or alternatively, a timing offset between a received DCI that triggers the AP-CSI-RS and the corresponding AP-CSI-RS may be less than a parameter beamSwitchTiming. In some embodiments, the UE may be configured to select, based on an implementation of the UE, the one or more CORESET TCI state configurations. Additionally or alternatively, the UE may be configured to transmit, to the BS, signaling comprising an indication of one or more TCI or default beam capabilities of the UE.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
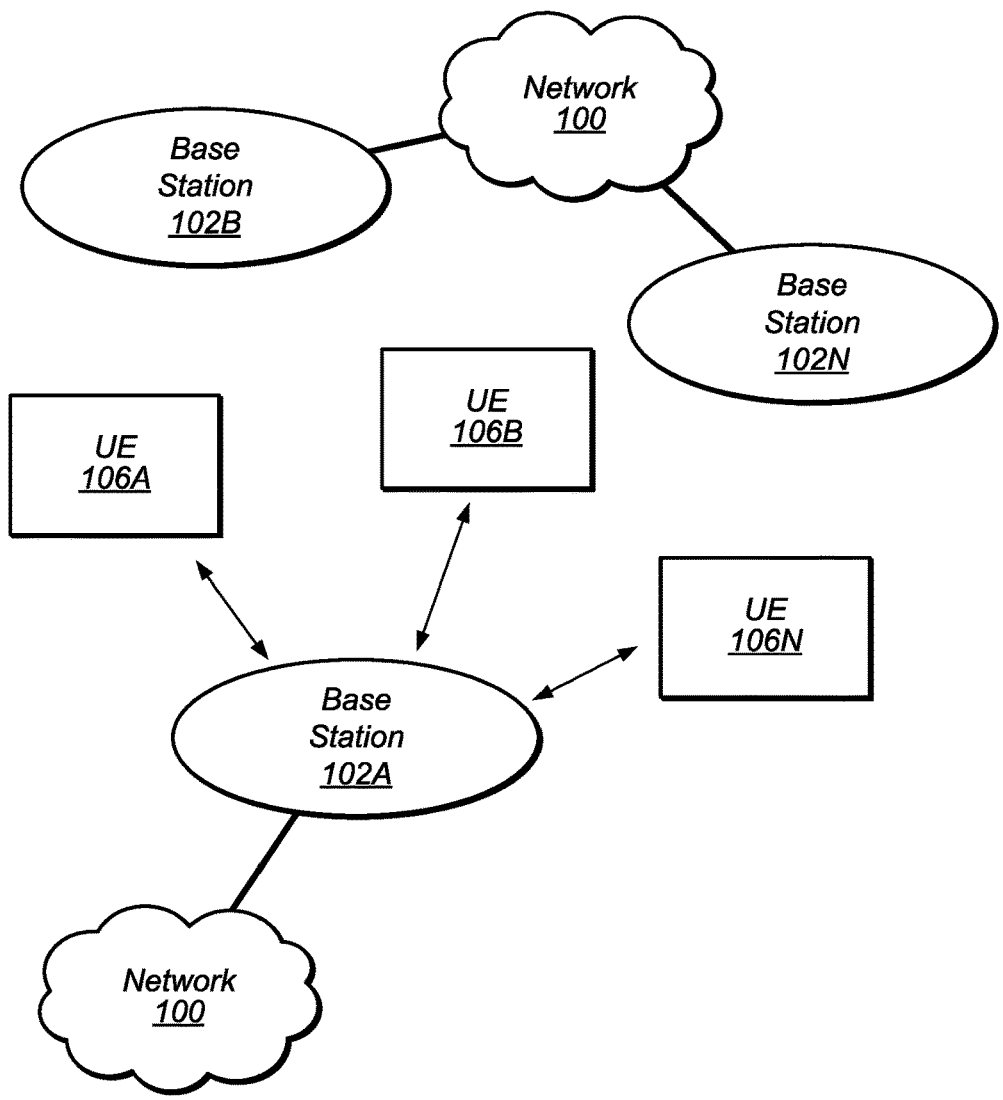
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
RRC: Radio Resource Control
HST: High Speed Train
SFN: Single Frequency Network
TRP: Transmission and Reception Point
MAC-CE: Media Access Control-Control Element
TCI: Transmission Configuration Indicator
CORESET: Control Resource Set
CSI-RS: Channel State Information-Reference Signal
CC: Component Carrier
RACH: Random Access Channel
RLC: Radio Link Control
NW: Network
UE: User Equipment
SI: System Information
SIB1: System Information Block-1
SSB: Synchronization Signal Block
PDCCH: Physical Downlink Control Channel
PUSCH: Physical Uplink Shared Channel
BWP: Bandwidth Part
RB: Resource Block
USS: UE-specific Search Space
CSS: Common Search Space
DCI: Downlink Control Information
ID: Identifier
QCL: Quasi-Co-Located or Quasi-Co-Location
CSI: Channel State Information CQI: Channel Quality Indicator
PMI: Precoding Matrix Indicator
RI: Rank Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
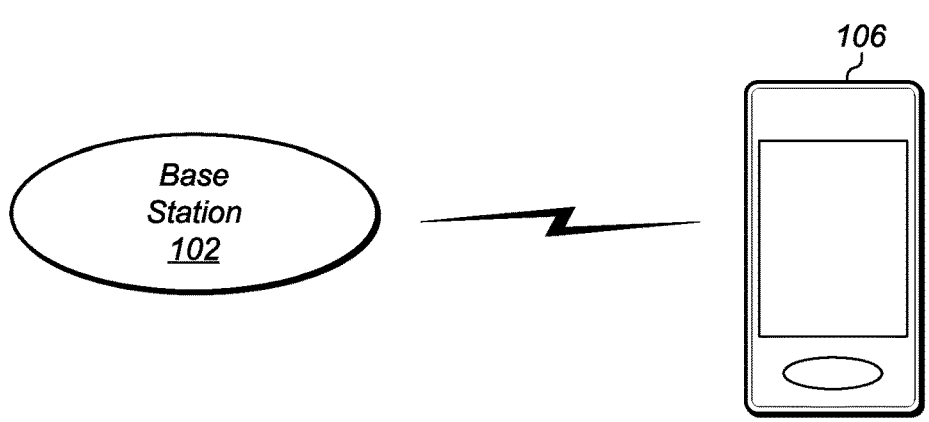
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
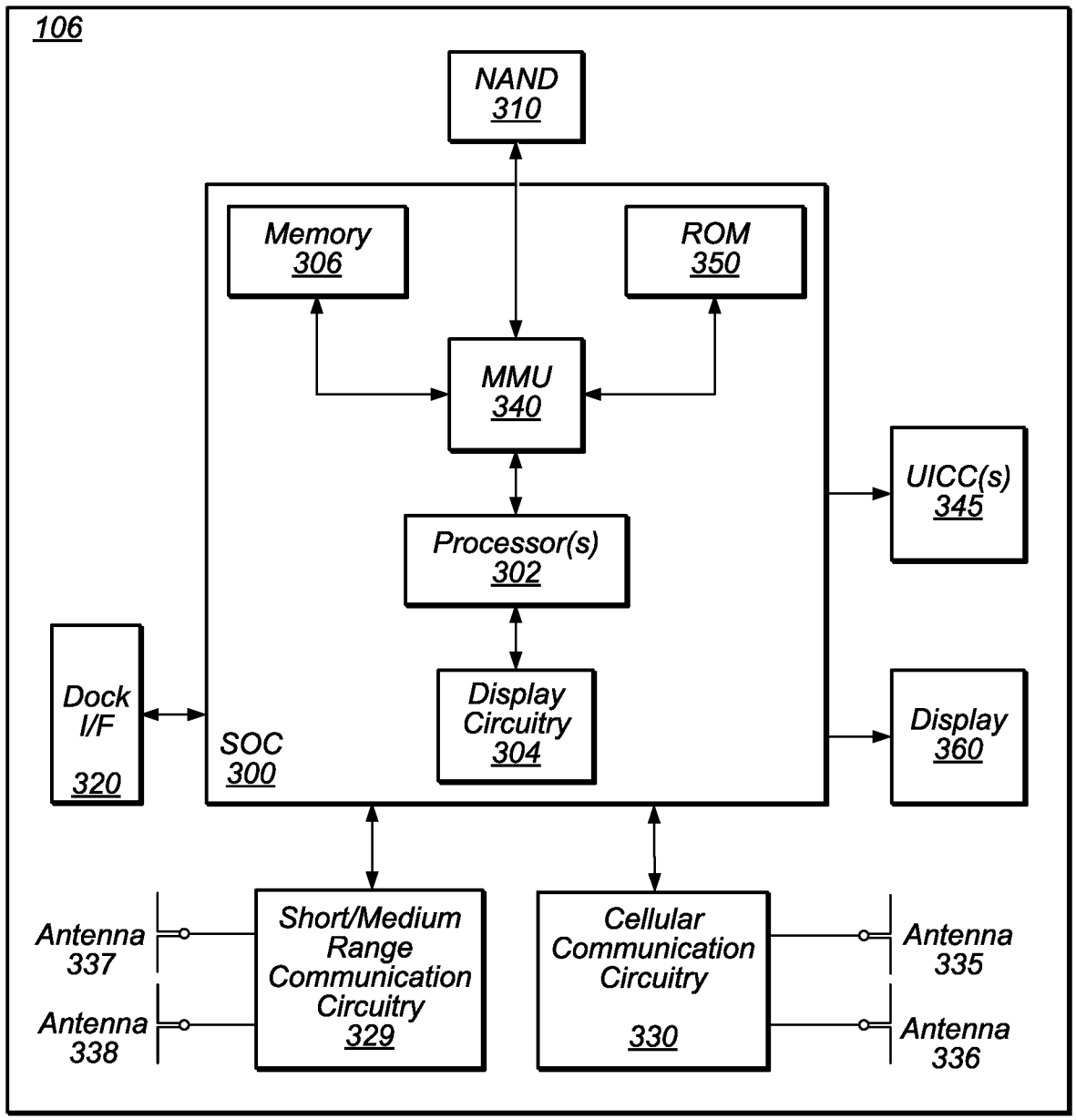
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
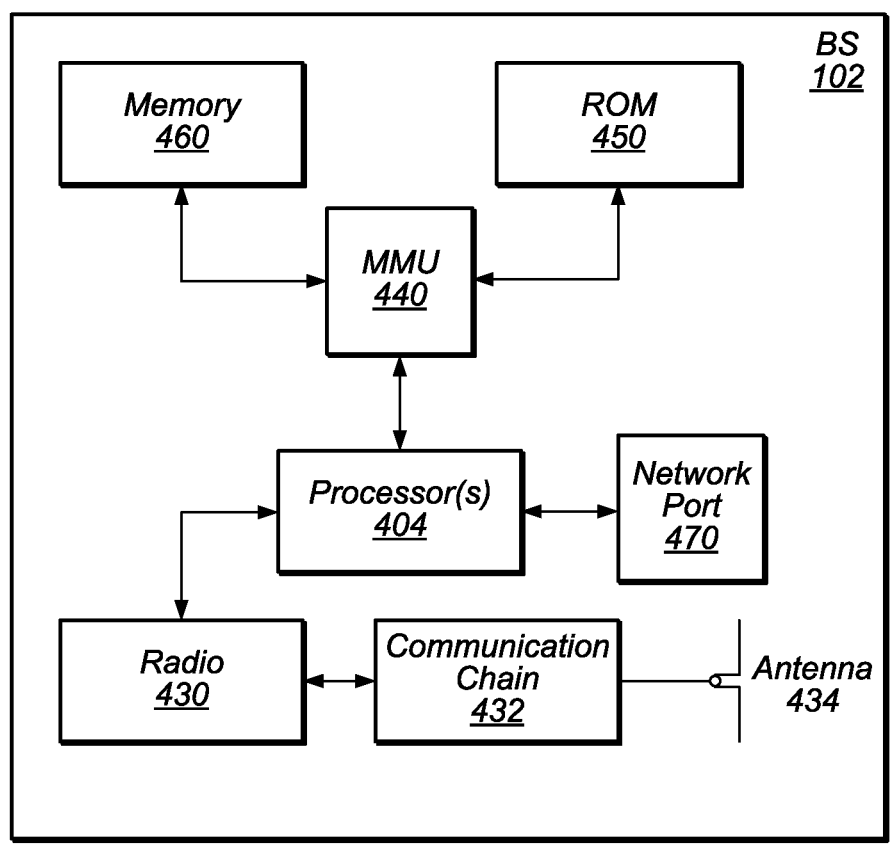
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
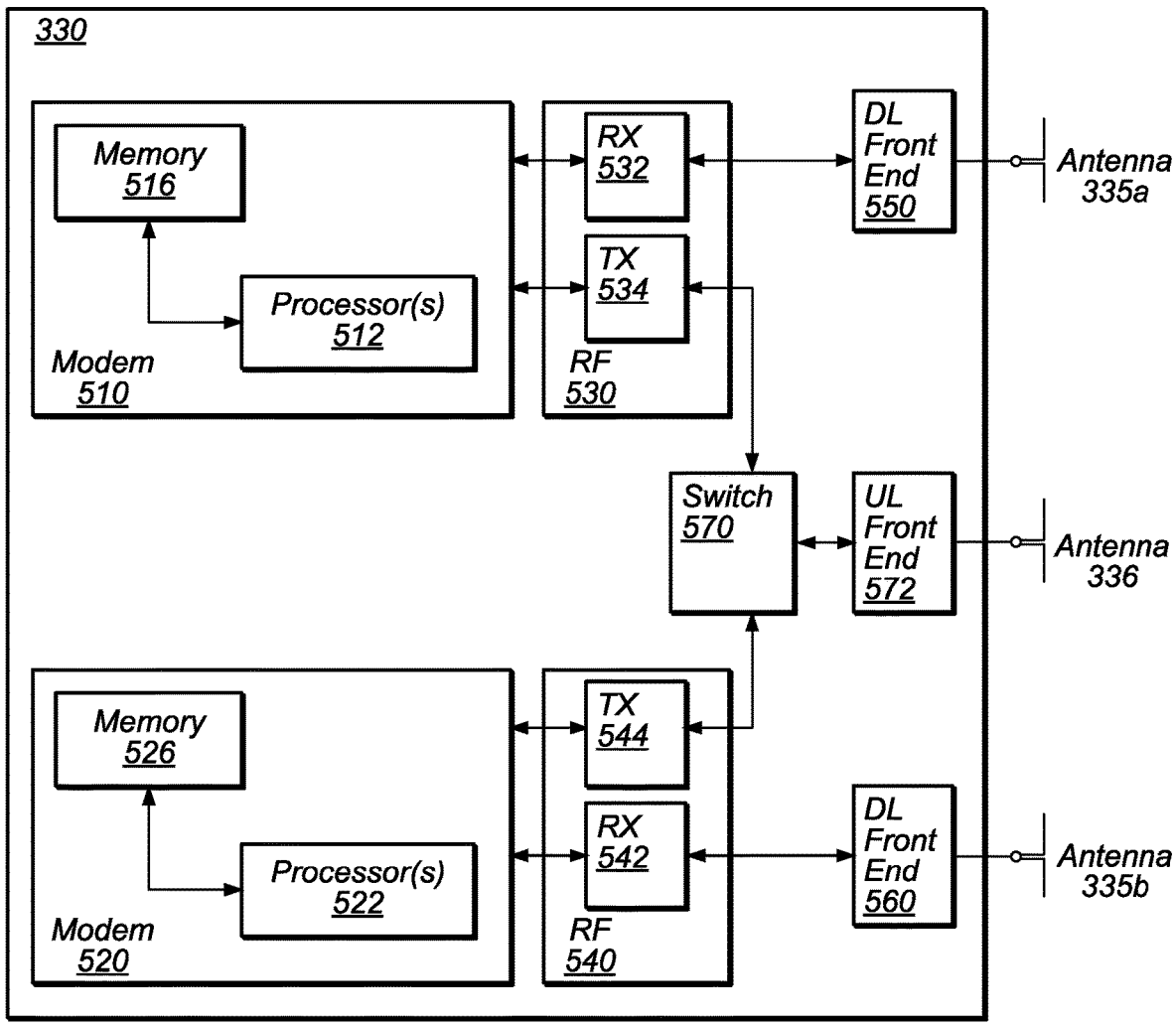
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Non-Standalone (NSA) Operation with LTE

Figure 6A:
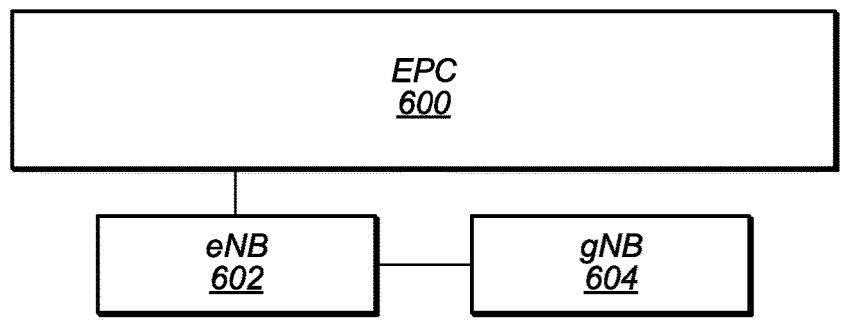
FIG. 6A illustrates an example of connections between an EPC network, an LTE base station (eNB), and a 5G NR base station (gNB), according to some embodiments.
Figure 6B:
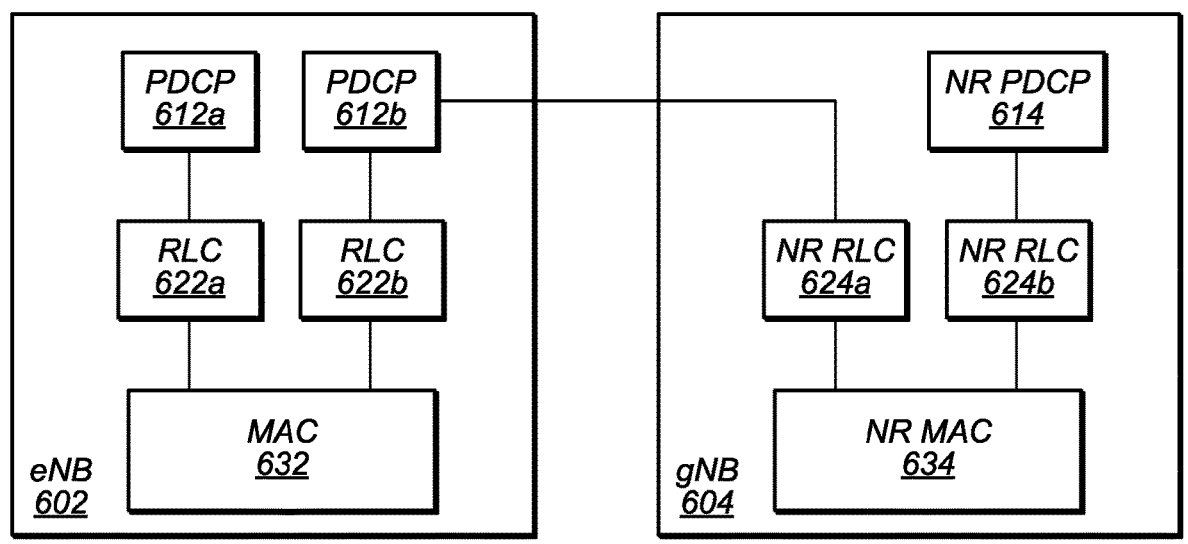
FIG. 6B illustrates an example of a protocol stack for an eNB and a gNB, according to some embodiments.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Reference Signals

A wireless device, such as a user equipment (UE), may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) such as aperiodic channel state information reference signals (AP-CSI-RS) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

Precoding matrix Indicator (PMI) feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Configuration and Default Beam Determination for High-Speed Single Frequency Network (SFN)

As wireless device usage grows generally, wireless devices are being used in an increasingly wide range of contexts. One such increasingly wide usage range may include the movement speed of a wireless device. Users may at times utilize their wireless devices when stationary, at pedestrian movement speeds, in motor vehicles, and while in even higher speed forms of transport such as high-speed trains, among various possibilities. The movement speed of a wireless device may have a variety of possible effects on the operation of the wireless device. For example, a wireless device moving at a high speed may move from one cell to another more frequently than a wireless device moving at a lower speed, and each such transition between cells may progress according to a more abbreviated timeline. Provided a wireless device can determine at what speed it is currently moving with sufficient accuracy, it may accordingly be possible to modify certain behaviors of the wireless device in accordance with the movement speed of the wireless device, to potentially improve user experience, reduce power consumption, and/or otherwise provide improved operating characteristics.

High Speed Trains (HSTs) have become an important mode of transportation in many parts of the world. Moreover, travelers frequently utilize wireless devices (e.g., cell phones) during these high-speed transits and therefore this is a scenario of particular interest to user equipment (UE) and network operators. As one HST scenario, when a UE (and therefore the HST) is in transit, it may travel between two transmission and reception points (TRPs). Accordingly, the UE may observe very high positive Doppler shifts from one TRP and very high negative Doppler shift from the other TRP. As a result, the composite channel may vary quickly (e.g., on the order of 2 kHz or more). This variation of the composite channel may potentially reduce the channel capability and/or make it challenging for UE to perform accurate channel estimation. As one potential solution (HST-SFN scheme 1), the UE may be configured to estimate the two separate Doppler shifts (one from each TRP) to assist the UE in channel estimation procedures. Additionally or alternatively, the network may be configured to pre-compensate for the Doppler shift (HST-SFN with pre-compensation). Accordingly, the NW may need to know the Doppler shift before it is able to provide said pre-compensation.

In some embodiments, media access control-control elements (MAC-CEs) may be used to configure two transmission configuration indicator (TCI) states for a control resource set (CORESET). Moreover, tracking reference signals (TRS) may be transmitted in a TRP-specific or non-SFN manner. Additionally or alternatively, demodulation reference signals (DM-RS) and physical downlink control channel/physical downlink shared channel (PDCCH/PDSCH) transmissions from the TRPs may be transmitted in a SFN manner. Accordingly, CORESET TCI configuration and determination of default beams for PDSCH and CSI-RS are areas of interest regarding HST-SFN configuration and default beam design improvements.

According to some embodiments, the network (e.g., a base station) may receive first signaling from a user equipment (UE) including Doppler shift measurements or an indication of one or more control resource sets (CORESETs) TCI configuration capabilities. For example, the UE may indicate whether it supports CORESETs with one TCI state or CORESETs with two TCI states. Additionally or alternatively, the UE may indicate that it supports a mixed configuration of CORESETS with one and/or two TCI states, according to some embodiments. Accordingly, the network may determine, based on the indication, one or more CORESET TCI states to configure the UE with such that the UE can more efficiently communicate with multiple TRPs of the network (of which it may be travelling between). For example, the network may, in order to allow for a more efficient way for the UE to communicate with the multiple TRPs or perform channel measurements thereof, determine that it should configure all CORESETs in the same active bandwidth part (BWP) of a component carrier (CC) to have a single TCI state. Additionally or alternatively, the network may determine that it should configure all CORESETs in the same active BWP of a CC to have two TCI states. According to some embodiments, the BS (e.g., network) may be able to configure some CORESETs with one TCI state and other/additional CORESETS (in the same active BWP of a CC) with two TCI states.

In some embodiments, the network may transmit signaling to the UE to configure one or more CORESETs with the one or more TCI states. According to some embodiments, the signaling may include media access control-control element (MAC-CE) signaling. For example, the MAC-CE may be able to configure each CORESET with one or two TCI states as a way to provide PDCCH reliability enhancement for HST. In some embodiments, for different CORESETs in the same active bandwidth part (BWP) in a Component Carrier (CC), the network (NW) may configure all CORESETs in the same active BWP in a CC, either all with two TCI states, or all with a single TCI state. Additionally or alternatively, the network may configure some CORESETs with one TCI state, and other CORESETs in the same active BWP in a CC with two TCI states. In some embodiments, the UE may be able to report a capability regarding whether the UE does or does not support the mixed configuration of some CORESETs with one TCI state and other CORESETs with two TCI states.

According to some embodiments, when one or more CORESETs are configured with one TCI state and one or more additional CORESETs are configured with two TCI states in the same BWP, the CORESETs associated with USS (UE-specific Search Space) may be required to be configured with the same scheme. For example, in some embodiments, the CORESETs may be configured such that they are all single-TRP scheme (e.g., configured with single TCI states). Additionally or alternatively, the CORESETs may be configured such that they are all HST-SFN scheme (e.g., configured with two TCI states). Accordingly, in the case in which they are configured with a HST-SFN scheme, they may be further configured with the same HST-SFN scheme. In other words, the CORESETs may all be configured such that they support a HST-SFN scheme 1 or a HST-SFN with pre-compensation.

According to some embodiments, when one or more CORESETs are configured with one TCI state and one or more additional CORESETs are configured with two TCI states in the same BWP, CORESETs associated with USS may be configured with two TCI states and CORESETs associated with CSS (Common Search Space) may be configured with one TCI state. Moreover, the CSS may involve utilizing one or multiple PDCCH CSS sets such as Type0-PDCCH CSS set for SIB1 monitoring, Type0A-PDCCH CSS set for other SI monitoring, Type1-PDCCH CSS set for other RACH monitoring, Type2-PDCCH CSS set for other paging monitoring, or Type3-PDCCH CSS set for special DCI 2_x monitoring.

According to further embodiments, when the same CORESET is configured in different Search Space, the same TCI configuration may be utilized for the same CORESET in different search spaces. Additionally or alternatively, different TCI states may be configured for the same CORESET in different search spaces, according to some embodiments. For example, a CORESET may have one TCI state in one search space and accordingly the same CORESET may have two TCI states when it is configured in a different search space. In some embodiments, the UE may report one or more capabilities regarding whether or not the UE supports the mixed configuration of some CORESETs with one TCI state and other CORESETs with two TCI states.

According to some embodiments, the UE may receive signaling from a base station (BS) of the network indicating one or more transmission configuration indicator (TCI) state configurations for the UE to utilize for communications with multiple TRPs of the network (e.g., the TRPs the UE may be travelling between at high speeds). For example, the UE may have previously indicated to the base station whether it supports CORESETs with one TCI state or CORESETs with two TCI states. Additionally or alternatively, the UE may have indicated that it supports a mixed configuration of CORESETS with one and/or two TCI states, according to some embodiments. Accordingly, the BS may determine that it should configure all CORESETs in the same active bandwidth part (BWP) of a component carrier (CC) to have a single TCI state. Additionally or alternatively, the network may determine that it should configure all CORESETs in the same active BWP of a CC to have two TCI states. According to some embodiments, the BS (e.g., network) may be able to configure some CORESETs with one TCI state and other/additional CORESETS (in the same active BWP of a CC) with two TCI states. Accordingly, the BS may transmit signaling to the UE indicating the one or more determined transmission configuration indicator (TCI) state configurations with which to configure the UE.

Accordingly, the UE may select, based on the indication, one or more default beams to use in interacting with the multiple TRPs. For example, the UE may utilize a default beam to perform sample buffering of one or more TRPs. In some embodiments, when the high speed SFN is not configured to support a physical downlink control channel (PDCCH) but is configured to support a physical downlink shared channel (PDSCH), one or more default beam may be selected to perform subsequent communications using the PDSCH, according to some embodiments. For example, a first scenario in which the NW does not configure the TCI in DCI and a second scenario may involve the NW configuring the TCI in DCI but a time offset between the reception of the DL DCI and the corresponding PDSCH is less than a specified parameter timeDurationForQCL. Accordingly, the PDSCH default beam may be determined by the TCI codepoint with the lowest index that contains two TCI states (among the activated TCI codepoints for PDSCH reception), according to some embodiments. Additionally or alternatively, the PDSCH default beam may be determined by the CORESET with the lowest ID in the latest slot that UE monitors PDCCH. According to some embodiments, the PDSCH default beam may be determined by the TCI codepoint with the lowest index that contains one TCI state (among the activated TCI codepoint for PDSCH reception). In some embodiments, the PDSCH default beam may be determined by the CORESET with the lowest ID and the second lowest ID (if existing) in the latest slot that the UE monitors the PDCCH.

According to some embodiments, the UE may use the selected one or more default beams in performing one or more transmissions and/or receptions in a PDCCH and/or PDSCH with the multiple TRPs. For example, the UE may perform communications with the multiple TRPs (e.g., the network) through utilization of the supported PDSCH. Additionally or alternatively, the UE may utilize the selected one or more default beams to perform channel estimation related to aperiodic channel state information reference signals (AP-CSI-RSs) of the multiple TRPs. In other words, the UE may communicate with the network through utilization of the selected default beam(s).

Additional Information

In some embodiments, when HST-SFN is configured for both PDCCH and PDSCH, a default beam may be determined for PDSCH according to the aforementioned scenarios in which the NW does not configure the TCI in DCI or an alternate scenario in which the NW does configure the TCI in DCI but a time offset between the reception of the DL DCI and the corresponding PDSCH is less than a specified parameter timeDurationForQCL. Accordingly, the PDSCH default beam may be determined by the TCI codepoint with the lowest index that contains two TCI states (among the activated TCI codepoint for PDSCH reception), according to some embodiments. Additionally or alternatively, the PDSCH default beam may be determined by the CORESET with the lowest ID that is configured with two TCI states in the latest slot that the UE monitors the PDCCH. Moreover, if a CORESET with two TCI states does not exist, the PDSCH default beam may be determined by the CORESET with the lowest ID with a single TCI state. According to some embodiments, the PDSCH default beam may be determined by the TCI codepoint with the lowest index that contains one TCI state (among the activated TCI codepoint for PDSCH reception). In some embodiments, the PDSCH default beam may be determined by the CORESET with the lowest ID that is configured with one TCI state in the latest slot that the UE monitors the PDCCH.

In some embodiments, when HST-SFN is configured for PDSCH, the UE may report whether or not the UE supports one or more enhanced PDSCH default beam capabilities. Additionally or alternatively, in the scenario in which the PDSCH default beam capability is not supported, the NW may be required to configure the TCI in a non-fallback DCI (e.g., DCI Formats 1_1 and 1_2). Accordingly, the NW may need to ensure that the time offset between the reception of the DL DCI and the corresponding PDSCH is greater than or equal to parameter timeDurationForQCL. In some embodiments, the NW may configure the TCI when HST-SFN is configured for PDSCH and/or PDCCH or when DCI based dynamic switching between HST-SFN and other single-TRP or multi-TRP schemes is configured for PDSCH.

According to some embodiments, when HST-SFN is not configured for PDCCH but HST-SFN is configured for PDSCH, a default beam for AP-CSI-RS may be determined according to the scenario in which the time offset between the reception of the DL DCI and the corresponding AP-CSI-RS is less than a parameter such as beamSwitchTiming. In some embodiments, the AP-CSI-RS default beam may be determined by the CORESET with the lowest ID in the latest slot that the UE monitors the PDCCH. Additionally or alternatively, the AP-CSI-RS default beam may be determined by the TCI codepoint with the lowest index that contains one TCI state (among the activated TCI codepoint for PDSCH reception). According to some embodiments, the AP-CSI-RS default beam may be determined by the TCI codepoint with the lowest index that contains two TCI states (among the activated TCI codepoint for PDSCH reception). Additionally or alternatively, the AP-CSI-RS default beam may be determined by the CORESET with the lowest ID and the second lowest ID (if existing) in the latest slot that the UE monitors the PDCCH.

According to some embodiments, when HST-SFN is configured for both PDCCH and PDSCH, a default beam for AP-CSI-RS may be determined according to the aforementioned scenario in which the time offset between the reception of the DL DCI and the corresponding AP-CSI-RS is less than a parameter such as beamSwitchTiming. For example, in some embodiments, the default beam for AP-CSI-RS may be determined according to the CORESET with the lowest ID in the latest slot that the UE monitors the PDCCH. For example, when the selected CORESET is configured with two TCI states, the first TCI state may be used or it may be determined by UE implementation to select one TCI state. Additionally or alternatively, the default beam for AP-CSI-RS may be determined according to the TCI codepoint with the lowest index that contains one TCI state (among the activated TCI codepoint for PDSCH reception). In some embodiments, the default beam for AP-CSI-RS may be determined according to the TCI codepoint with the lowest index that contains two TCI states (among the activated TCI codepoint for PDSCH reception). Additionally or alternatively, the default beam for AP-CSI-RS may be determined according to the CORESET with the lowest ID that is configured with one TCI state in the latest slot that the UE monitors the PDCCH.

According to some embodiments, when HST-SFN is configured for PDCCH but not configured for PDSCH, a default beam for AP-CSI-RS may be determined according to the aforementioned scenario in which the time offset between the reception of the DL DCI and the corresponding AP-CSI-RS is less than a parameter such as beamSwitchTiming. For example, in some embodiments, the default beam for AP-CSI-RS may be determined according to the CORESET with the lowest ID in the latest slot that the UE monitors the PDCCH. Accordingly, when the selected CORESET is configured with two TCI states, the first TCI state may be used or it may be left to the UE's implementation to select one TCI state. Additionally or alternatively, the default beam for AP-CSI-RS may be determined according to the TCI codepoint with the lowest index (among the activated TCI codepoint for PDSCH reception). In some embodiments, the default beam for AP-CSI-RS may be determined according to the CORESET with the lowest ID that is configured with one TCI state in the latest slot that the UE monitors the PDCCH. According to further embodiments, when HST-SFN is configured for PDSCH and/or PDCCH, the UE may be configured to report whether or not it supports enhanced AP-CSI-RS default beam capabilities.

Figure 7:
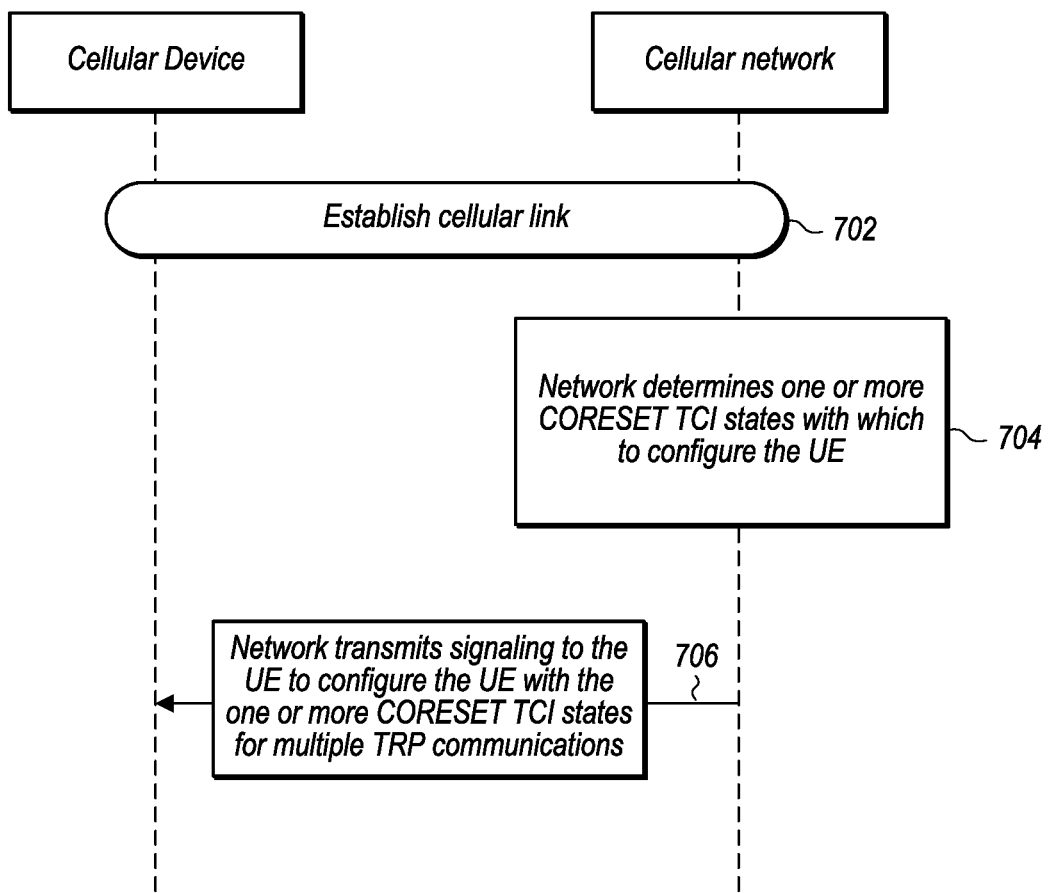
FIG. 7 is a flowchart diagram illustrating an example method for establishing a control resource set (CORESET) transmission configuration indicator (TCI) configuration for high-speed train single frequency network (HST-SFN) scenarios, according to some embodiments.

FIG. 7—Method of CORESET TCI Configuration in a High-Speed Single Frequency Network As wireless device capabilities increase, it may be useful to provide techniques that can make use of those increased wireless device capabilities, for example to improve the reliability of wireless communications, to reduce the latency of wireless communications, to increase the amount of data that can be communicated, and/or for any of various other possible reasons.

One wireless device capability that may be beneficial to make use of when performing wireless communications may include the ability to use multiple beams for transmitting and/or receiving, either concurrently/simultaneously or at different times, for example to increase the amount of data that can be transmitted and/or to improve the reliability of wireless communications by providing repetitions of communicated data or signaling with beam diversity.

Among possible areas in which such use of multiple beams could be introduced to potentially improve communication reliability and/or provide other possible benefits, CORESET TCI configuration for multiple TRPs in a high-speed single frequency network may be included, at least according to some embodiments.

Thus, it may be beneficial to specify techniques for performing CORESET TCI configuration for multiple TRPs in a high-speed single frequency network scenario, at least in some instances. To illustrate such possible techniques, FIG. 7 is a signal flow diagram illustrating methods for performing CORESET TCI configuration in a high-speed single frequency network scenario in a wireless communication system, at least according to some embodiments.

Aspects of the method of FIG. 7 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 702, the wireless device may establish a cellular link with a cellular network. The cellular link may operate according to a single frequency network (SFN) scheme. In some instances, the SFN scheme may more particularly be a high speed train (HST) SFN scheme, which may be used to provide service to wireless devices travelling in high speed trains. According to some embodiments, the cellular link may operate according to 5G NR. For example, the wireless device may establish a session with an AMF entity of the cellular network by way of one or more gNBs that provide radio access to the cellular network. As another possibility, the cellular link may operate according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission configuration indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 704, the network may determine one or more CORESET TCI states with which to configure the UE for communication with multiple TRPs (e.g., at least a first and second TRP of the network). For example, the network may, in order to allow for a more efficient way for the UE to communicate with the multiple TRPs or perform sample buffering or channel measurements thereof, determine that it should configure all CORESETs in the same active bandwidth part (BWP) of a component carrier (CC) to have a single TCI state. Additionally or alternatively, the network may determine that it should configure all CORESETs in the same active BWP of a CC to have two TCI states. According to some embodiments, the BS (e.g., network) may be able to configure some CORESETs with one TCI state and other/additional CORESETS (in the same active BWP of a CC) with two TCI states.

According to some embodiments, the cellular network (e.g., a cellular base station configured to provide one or more TRPs in the cellular network) may receive signaling from the wireless device (e.g., a user equipment) including measurement information corresponding to first and second TRPs of the network. Additionally or alternatively, the measurement information may include Doppler shift measurement information corresponding to first and second TRPs of the network. For example, due to the UE travelling at high speeds and utilizing the single frequency network, the UE may have measured higher or positive Doppler shift measurements from one TRP and lower or negative Doppler shift measurements from another TRP. Accordingly, in order to facilitate a better connection with the network, the UE may elect to transmit this information to the network. In some embodiments, the UE may further indicate CORESET TCI configuration capabilities of the UE. For example, the UE may indicate whether it supports CORESETs with one TCI state or CORESETs with two TCI states. Additionally or alternatively, the UE may indicate that it supports a mixed configuration of CORESETS with one and/or two TCI states, according to some embodiments.

More specifically, in the example of the received measurement information including Doppler shift measurement information, when the UE reports high doppler shift measurement result, the network may determine that it should configure two TCI states for CORESET to compensate for the measured high doppler shift. Additionally or alternatively, if the UE reports low to medium doppler shift measurement information, the network may configure one TCI state for CORESET. In some embodiments, if the UE reports that it does not support two TCI states for CORESET, the network may configure a single TCI state for CORESET. Additionally or alternatively, the network may configure two TCI states for CORESET.

In 706, the network may transmit signaling to the cellular device (e.g., UE) to configure it with the determined CORESET TCI states. Accordingly, the UE may be configured with the determined CORESET TCI states corresponding to each of multiple TRPs to use for subsequent communications, sample buffering, and/or channel measurements, according to some embodiments.

Figure 8:
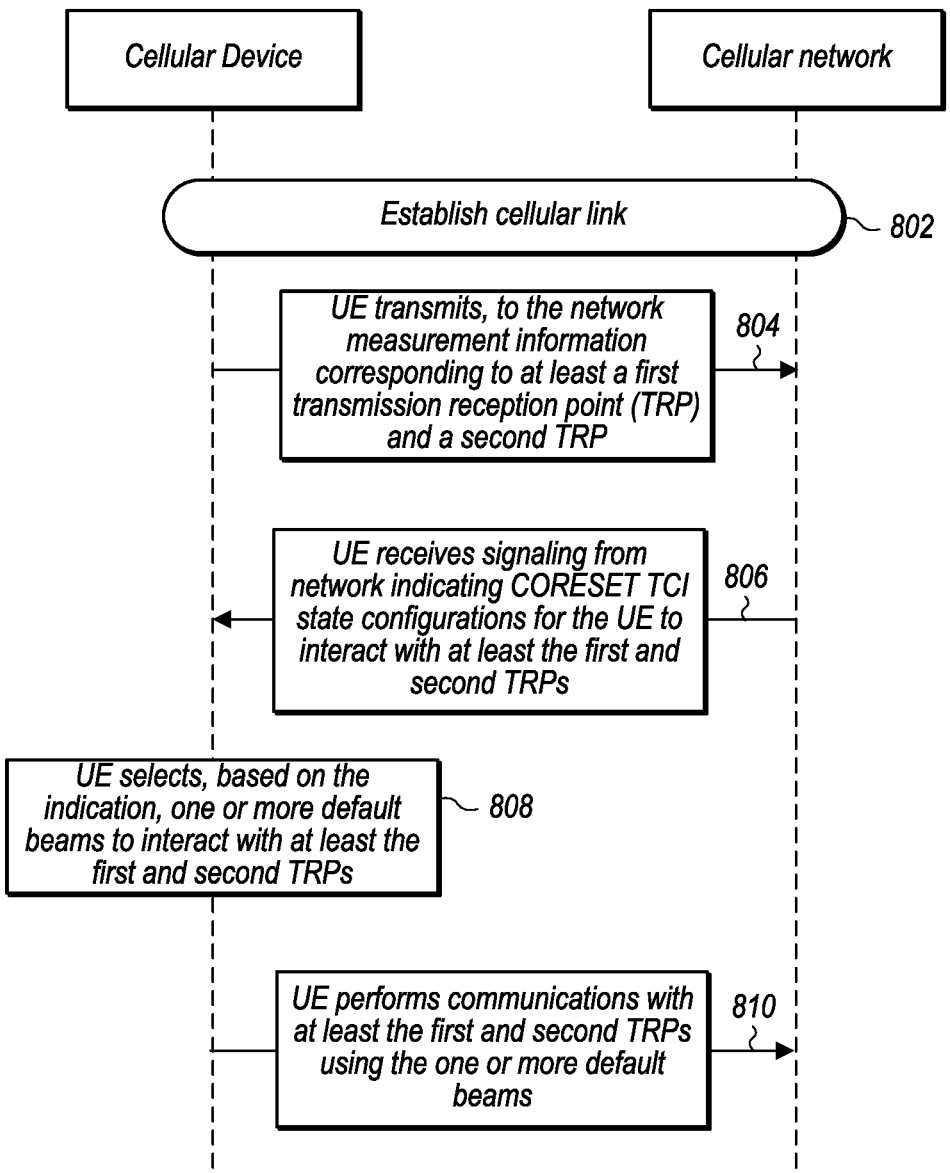
FIG. 8 is a flowchart diagram illustrating an example method for determining a default beam for a physical downlink shared channel (PDSCH) or aperiodic channel state information reference signals (AP-CSI-RS) in HST-SFN scenarios, according to some embodiments.

FIG. 8—Method of Determining a Default Beam for PDSCH and/or AP-CSI-RS in a High-Speed Single Frequency Network Another possible area in which such use of multiple beams could be introduced to potentially improve communication reliability and/or provide other possible benefits, determining a default beam for PDSCH and/or AP-CSI-RS in a high-speed single frequency network may be included, at least according to some embodiments.

Thus, it may be beneficial to specify techniques for determining a default beam for PDSCH and/or AP-CSI-RS for communication with multiple TRPs in a high-speed single frequency network scenario, at least in some instances. To illustrate such possible techniques, FIG. 8 is a signal flow diagram illustrating methods for performing said determination of a default beam for PDSCH and/or AP-CSI-RS in a high-speed single frequency network scenario in a wireless communication system, at least according to some embodiments.

Aspects of the method of FIG. 8 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 802, the wireless device may establish a cellular link with a cellular network. The cellular link may operate according to a single frequency network (SFN) scheme. In some instances, the SFN scheme may more particularly be a high speed train (HST) SFN scheme, which may be used to provide service to wireless devices travelling in high speed trains. According to some embodiments, the cellular link may operate according to 5G NR. For example, the wireless device may establish a session with an AMF entity of the cellular network by way of one or more gNBs that provide radio access to the cellular network. As another possibility, the cellular link may operate according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission configuration indicators (TCIs), e.g., which may correspond to various beams that can be used to communicate with the TRPs. Further, it may be the case that one or more configured TCI states may be activated by media access control (MAC) control element (CE) for the wireless device at a particular time. At least in some instances, establishing the wireless link(s) may include the wireless device providing capability information for the wireless device. Such capability information may include information relating to any of a variety of types of wireless device capabilities.

In 804, the UE may transmit, to the network, signaling including measurement information corresponding to first and second TRPs of the network. For example, due to the UE travelling at high speeds and utilizing the single frequency network, the UE may have performed channel measurements or other communications (e.g., sample buffering) with the TRPs. Accordingly, in order to facilitate a better connection with the network, the UE may elect to transmit this information to the network. In some embodiments, the UE may further indicate CORESET TCI configuration capabilities of the UE. For example, the UE may indicate whether it supports CORESETs with one TCI state or CORESETs with two TCI states. Additionally or alternatively, the UE may indicate that it supports a mixed configuration of CORESETS with one and/or two TCI states, according to some embodiments.

According to some embodiments, the measurement information may include Doppler shift measurement information. For example, due to the UE travelling at high speeds and utilizing the single frequency network, the UE may have measured higher or positive Doppler shift measurements from one TRP and lower or negative Doppler shift measurements from another TRP. Accordingly, in order to facilitate a better connection with the network, the UE may elect to transmit this information to the network.

In 806, the UE may receive signaling from network indicating CORESET TCI state configurations for the UE to interact with multiple TRPs (e.g., the first and second TRPs) of the network. For example, the UE may receive signaling from a base station (BS) of the network indicating one or more transmission configuration indicator (TCI) state configurations for the UE to utilize for communications with multiple TRPs operating according to the single frequency network (e.g., the first and second TRPs the UE may be travelling between at high speeds). In some embodiments, the network may have determined the CORESET TCI state configurations based on the received Doppler shift measurements reported by the UE. According to some embodiments, the UE may have also previously indicated to the base station whether it supports CORESETs with one TCI state or CORESETs with two TCI states. Additionally or alternatively, the UE may have indicated that it supports a mixed configuration of CORESETS with one and/or two TCI states, according to some embodiments. Accordingly, the BS may determine that it should configure all CORESETs in the same active bandwidth part (BWP) of a component carrier (CC) to have a single TCI state. Additionally or alternatively, the network may determine that it should configure all CORESETs in the same active BWP of a CC to have two TCI states. According to some embodiments, the BS (e.g., network) may be able to configure some CORESETs with one TCI state and other/additional CORESETS (in the same active BWP of a CC) with two TCI states.

In 808, the UE may select, based on the received CORESET TCI state configurations, one or more default beams to interact (e.g., communicate and/or perform channel measurements) with the multiple TRPs (e.g., the first and second TRPs) of the SFN. For example, the UE may utilize a default beam to perform channel measurements of one or more TRPs of the high speed SFN. In some embodiments, when the high speed SFN is not configured to support a physical downlink control channel (PDCCH) but is configured to support a physical downlink shared channel (PDSCH), one or more default beam may be selected to perform subsequent communications using the PDSCH, according to some embodiments. the PDSCH default beam may be determined by the TCI codepoint with the lowest index that contains two TCI states (among the activated TCI codepoints for PDSCH reception), according to some embodiments. Additionally or alternatively, the PDSCH default beam may be determined by the CORESET with the lowest ID in the latest slot that UE monitors PDCCH. According to some embodiments, the PDSCH default beam may be determined by the TCI codepoint with the lowest index that contains one TCI state (among the activated TCI codepoint for PDSCH reception). In some embodiments, the PDSCH default beam may be determined by the CORESET with the lowest ID and the second lowest ID (if existing) in the latest slot that the UE monitors the PDCCH.

In 808, UE performs communications/channel measurements of the multiple TRPs using the one or more selected default beams. For example, the UE may perform communications with the multiple TRPs (e.g., the network) through utilization of the supported PDSCH. Additionally or alternatively, the UE may utilize the selected one or more default beams to perform channel estimation related to aperiodic channel state information reference signals (AP-CSI-RSs) of the multiple TRPs. In other words, the UE may perform subsequent communications with the network through utilization of the selected default beam(s).

Note that while various embodiments described herein may relate to 5G/NR, they may be extended to any set of wireless communication, including LTE, GSM, CDMA, etc.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   establishing a cellular link with a user equipment (UE) according to a single frequency network (SFN) scheme;
   determining one or more control resource set (CORESET) transmission configuration indication (TCI) states with which to configure the UE, wherein the one or more CORESET TCI states are associated with a common search space (CSS) comprising at least one of:
      a Type0-physical downlink control channel (PDCCH) CSS set for system information broadcast 1 (SIB1) monitoring,
      a Type0A-PDCCH CSS set for system information (SI) monitoring,
      a Type1-PDCCH CSS set for random access channel (RACH) monitoring,
      a Type2-PDCCH CSS set for paging monitoring, or
      a Type3-PDCCH CSS set for special downlink control information (DCI) 2_x monitoring; and
   transmitting, to the UE, signaling to configure the UE with the one or more CORESET TCI states, wherein the one or more CORESET TCI states are useable by the UE in performing communications with at least one of a first transmission reception point (TRP) and a second TRP associated with the cellular link.

2. The method of claim 1, wherein the signaling comprises media access control-control element (MAC-CE) signaling.

3. The method of claim 1, wherein the one or more CORESET TCI states are comprised in an active bandwidth part (BWP) of a component carrier (CC).

4. The method of claim 1, wherein the one or more CORESET TCI states are associated with a UE-specific search space (USS).

5. The method of claim 1, wherein the one or more CORESET TCI states are configured in different search spaces.

6. The method of claim 1, further comprising:
   receiving, from the UE, additional signaling comprising measurement information corresponding to the first TRP and the second TRP.

7. The method of claim 6, wherein the measurement information further comprises Doppler shift measurement information corresponding to the first TRP and the second TRP.

8. The method of claim 1, further comprising:
   receiving, from the UE, other signaling indicating whether the UE supports CORESETs with one TCI state or CORESETs with two TCI states.

9. The method of claim 1, further comprising:
   receiving, from the UE, other signaling indicating that the UE supports a mixed configuration of CORESETS with at least one of one or two TCI states.

10. A method, comprising:
    establishing a cellular link with a base station (BS) according to a single frequency network (SFN) scheme;
    receiving, from the BS, signaling to configure one or more control resource set (CORESET) transmission configuration indication (TCI) states, wherein the one or more CORESET TCI states are associated with a common search space (CSS) comprising at least one of:
       a Type0-physical downlink control channel (PDCCH) CSS set for system information broadcast 1 (SIB1) monitoring,
       a Type0A-PDCCH CSS set for system information (SI) monitoring,
       a Type1-PDCCH CSS set for random access channel (RACH) monitoring,
       a Type2-PDCCH CSS set for paging monitoring, or
       a Type3-PDCCH CSS set for special downlink control information (DCI) 2_x monitoring; and
    performing communications, using the one or more CORESET TCI states, with at least one of a first transmission reception point (TRP) and a second TRP associated with the cellular link.

11. The method of claim 10, wherein the signaling comprises media access control-control element (MAC-CE) signaling.

12. The method of claim 10, wherein the one or more CORESET TCI states are comprised in an active bandwidth part (BWP) of a component carrier (CC).

13. The method of claim 10, wherein the one or more CORESET TCI states are associated with a user equipment (UE)-specific search space (USS).

14. The method of claim 10, wherein the one or more CORESET TCI states are configured in different search spaces.

15. The method of claim 10, further comprising:
    transmitting, to the BS, additional signaling comprising measurement information corresponding to the first TRP and the second TRP.

16. An apparatus, comprising:
    a processor configured to, when executing instructions stored in a memory, perform operations comprising:
       establishing a cellular link with a user equipment (UE) according to a single frequency network (SFN) scheme;
       determining one or more control resource set (CORESET) transmission configuration indication (TCI) states with which to configure the UE, wherein the one or more CORESET TCI states are associated with a common search space (CSS) comprising at least one of:
          a Type0-physical downlink control channel (PDCCH) CSS set for system information broadcast 1 (SIB1) monitoring,
          a Type0A-PDCCH CSS set for system information (SI) monitoring,
          a Type1-PDCCH CSS set for random access channel (RACH) monitoring,
          a Type2-PDCCH CSS set for paging monitoring, or
          a Type3-PDCCH CSS set for special downlink control information (DCI) 2_x monitoring; and
       transmitting, to the UE, signaling to configure the UE with the one or more CORESET TCI states, wherein the one or more CORESET TCI states are useable by the UE in performing communications with at least one of a first transmission reception point (TRP) and a second TRP associated with the cellular link.

17. The apparatus of claim 16, wherein the operations further comprise:
    receiving, from the UE, additional signaling comprising measurement information corresponding to the first TRP and the second TRP.

18. The apparatus of claim 17, wherein the measurement information further comprises Doppler shift measurement information corresponding to the first TRP and the second TRP.

19. The apparatus of claim 16, wherein the operations further comprise:
   receiving, from the UE, other signaling indicating whether the UE supports CORESETs with one TCI state or CORESETs with two TCI states.

20. The apparatus of claim 16, wherein the operations further comprise:
   receiving, from the UE, other signaling indicating that the UE supports a mixed configuration of CORESETS with at least one of one or two TCI states.

* * * * *